United States Patent
Iannone et al.

(10) Patent No.: US 7,077,104 B2
(45) Date of Patent: Jul. 18, 2006

(54) METHOD FOR CLEANING AN ACTUATOR MOTOR FOR AN INTAKE AIR VALVE ON AN INTERNAL COMBUSTION ENGINE

(75) Inventors: Charles A. Iannone, West Henrietta, NY (US); Stuart M. Beck, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 320 days.

(21) Appl. No.: 10/674,839

(22) Filed: Sep. 30, 2003

(65) Prior Publication Data

US 2005/0066938 A1   Mar. 31, 2005

(51) Int. Cl.
*F02D 1/00* (2006.01)
(52) U.S. Cl. .............................. 123/399; 123/361
(58) Field of Classification Search ........... 123/361, 123/399, 343, 337
See application file for complete search history.

(56) References Cited

U.S. PATENT DOCUMENTS

| | | | |
|---|---|---|---|
| 6,591,809 B1* | 7/2003 | Saito et al. | 123/399 |
| 6,626,143 B1* | 9/2003 | Wayama et al. | 123/399 |
| 2004/0129252 A1* | 7/2004 | Wayama et al. | 123/399 |
| 2005/0072403 A1* | 4/2005 | Miyazaki et al. | 123/399 |

* cited by examiner

*Primary Examiner*—John T. Kwon
(74) *Attorney, Agent, or Firm*—Patrick M. Griffin

(57) ABSTRACT

A method and apparatus for cleaning incipient build-up of commutation byproducts from the commutators and brushes of a DC motor actuator for an air intake valve on an internal combustion engine. A controller for controlling the position of the intake air control valve is programmed via an algorithm to force the air control valve, abruptly and rapidly, to its open and/or closed position at least once at predetermined times in the engine's operating cycle, preferably immediately after engine shutdown. Such abrupt and rapid motion of the motor breaks loose such incipient build-up and thereby maintains the motor actuator at a high power output.

7 Claims, 2 Drawing Sheets

METHOD FOR CLEANING AN ACTUATOR MOTOR FOR AN INTAKE AIR VALVE ON AN INTERNAL COMBUSTION ENGINE

TECHNICAL FIELD

The present invention relates to internal combustion engines; more particularly, to air intake control valves for internal combustion engines; and most particularly, to method and apparatus for cleaning the commutator and brushes of a DC actuating motor for an engine air intake control valve.

BACKGROUND OF THE INVENTION

Electronic Throttle Control (ETC) systems for gasoline-powered internal combustion engines, and Intake Throttle Valve (ITHV) systems for diesel-powered engines, commonly employ an Air Control Valve (ACV) that is actuated by a DC brush-type motor. The motor actuator responds to a closed-loop position control algorithm programmed into an Engine Control Module (ECM) to control air flow through the ACV, which in turn responds to engine operator input. For vehicular engines, the operator is the vehicle's driver.

The usage profile of the DC motor actuator is quite operator-dependent. Aggressive drivers will likely have aggressive throttle maneuvers, with rapid, large throttle position changes. Such changes are beneficial for cleaning the commutator and brushes of the motor actuator. Without an occasional large and rapid angular change requirement of the ACV, the DC motor commutator can acquire a build-up of material from the brushes. Further, there is opportunity for build-up of oxidation products on the brushes themselves. Either of such build-ups results in higher resistance of the brush motor, and therefore lower power output.

What is needed is a means for preventing significant build-up of contaminants, and especially commutation byproducts, on the commutators and brushes of a DC motor actuator for an intake air control valve on an internal combustion engine.

It is a principal object of the present invention to prevent significant build-up of contaminants, and especially commutation byproducts, on the commutator and brushes of a DC motor actuator for an intake air control valve on an internal combustion engine by periodically exercising an engine ACV, abruptly and rapidly, to the open and closed limits of its operating range. Preferably, such exercising should occur when such extremes cannot affect operation of the associated engine, such as before starting or after shutdown.

SUMMARY OF THE INVENTION

Briefly described, the ECM or other programmable controller for a DC motor actuator for the intake air control valve on an internal combustion engine is programmed via an algorithm to force the air control valve, abruptly and rapidly, to its open and/or closed position at least once at predetermined times in the engine's operating cycle, preferably immediately after engine shutdown. This rapid and extreme motion of the motor dislodges incipient build-up of contaminants from the motor commutator and brushes, thus preventing progressive power loss of the motor.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
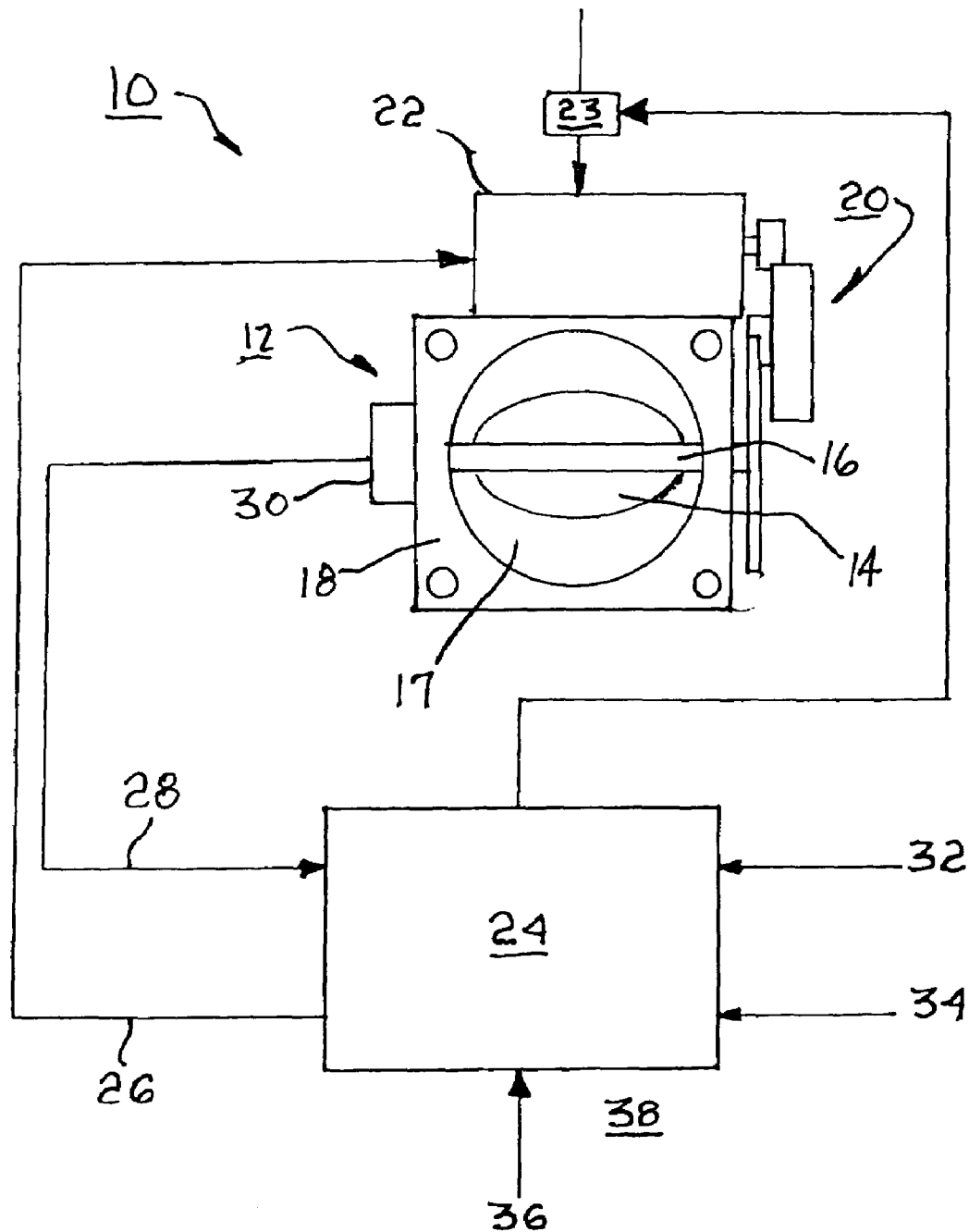
FIG. 1 is a schematic drawing of a system of apparatus and logic pathways for performing a motor cleaning method in accordance with the invention.

Referring to FIG. 1, an engine air control system 10 in accordance with the invention includes an engine Air Control Valve (ACV) assembly 12 having means for throttling air flow therethrough. Currently preferred throttle means includes a butterfly valve 14 mounted on a rotatable throttle shaft 16 extending across throat 17 in valve body 18 in known fashion and having a predetermined range of rotary motion of about 90°. Shaft 16 is rotatable by a gear train 20 actuated by an actuator 22, preferably a known DC motor actuator including conventional commutator and brushes. Actuator 22 is powered by power source 23 independent of power flowing through the engine ignition system. Thus, the actuator is still powered when the ignition key is switched off. A programmable electronic controller 24, which may be a general Engine Control Module or a specific Throttle Actuator Control Module, controls motor power source 23, sends actuating signals 26 to actuator 22, and receives throttle position signals 28 from throttle position sensor 30 attached to throttle shaft 16. Controller 24 further receives power 32, ignition key status signals 34, and operator input 36.

In known and conventional operation, when the ignition key is in the ON position for normal engine operation, controller 24 receives and processes operator input 36 regarding demand on engine 38 and signals actuator 22 to change the rotary position of shaft 16 and butterfly valve 14 to change the flow of air through ACV assembly 12.

Figure 2:
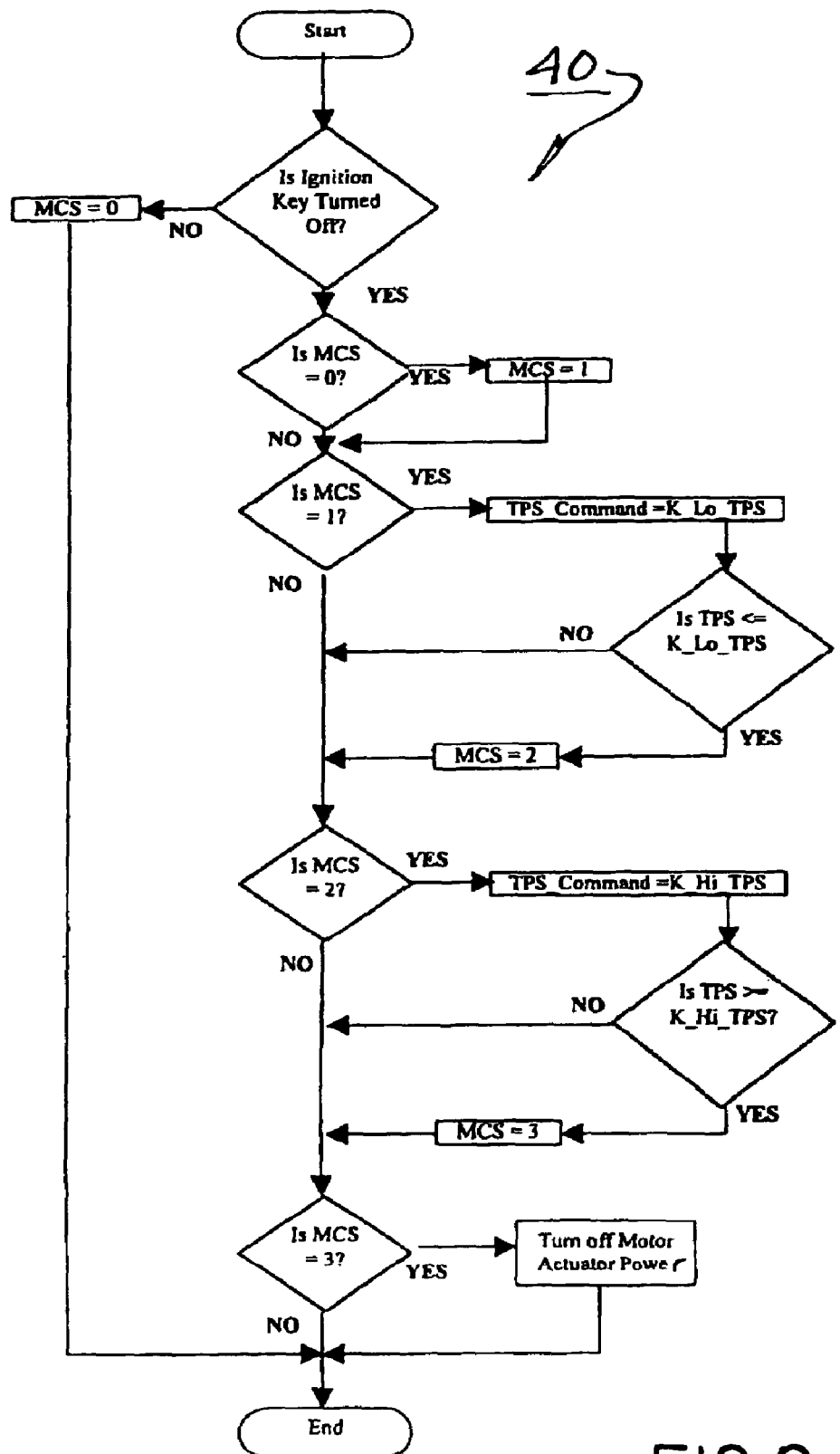
FIG. 2 is a dichotomous logic control diagram for operation of the apparatus and pathways shown in FIG. 1.

Referring to FIGS. 1 and 2, a motor-cleaning dichotomous algorithm 40 is programmed into controller 24 and is timed to run frequently, preferably about every 33 milliseconds or oftener, as long as power 32 is supplied to controller 24.

In algorithm 40, the following variable definitions apply:

MCS: The motor clean state, which is a state machine variable to coordinate the current state of the shutdown motor.

TPS: The current actual throttle position.

TPS_Command: The current commanded throttle position for engine control.

K_Lo_TPS: The low commanded throttle position (or shaft/valve angle) for motor cleaning, typically between about 1% and 5% (or about 1° and 5°) throttle position as calculated by the controller.

K_Hi_TPS: The high commanded throttle position (or shaft/valve angle) for motor cleaning, typically between about 95% and 99% (or about 85° and 89°) throttle position as calculated by the controller.

The cleaning steps in FIG. 2 are bypassed as long as the ignition key is turned on. In the first inquiry after the key is turned off, the algorithm determines whether the motor clean state is in its ground state (MCS=0); when that is so, the algorithm sets a first motor clean state (MCS=1) and commands the actuator to drive the shaft/butterfly valve toward the low throttle position (TPS_Command=K_Lo_TPS) until the actual throttle position is less than or equal to the low commanded position (TPS_Command<=K_Lo_TPS). This command is repeated as required, preferably at least every 33 ms, until the condition is met, although preferably the condition is met at the first command, to maximize mechanical shock to the motor contaminants. The algorithm then sets a second motor clean state (MCS=2) and commands the actuator to drive the shaft/butterfly valve toward the high throttle position (TPS_Command=K_Hi_TPS) until the actual throttle position is greater than or equal to the high commanded position (TPS_Command>=K_Hi_TPS). When both high and low positions have been reached, the algorithm sets a third motor clean condition (MCS=3) and turns off power source 23 to the actuator motor. Controller power 32 may also be turned off. Preferably, the controller remains powered for at least 500 milliseconds after the ignition key is turned off, to complete the cleaning steps. The controller and actuator motor are re-powered when the ignition key is turned to the ON position again.

Because the iteration of algorithm 40 is so frequent, the motion of actuator motor 22 is abrupt and rapid, preferably even more so than when responding to normal operator commands of a vehicle. Consistent with the object of the invention, such abrupt and rapid motion dislodges incipient build-up of commutation byproducts from the commutators and brushes of the motor, thus preventing gradual and progressive power loss thereof.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for removing contamination from commutators and brushes of a DC motor operationally connected to an intake air control valve of an internal combustion engine and having a predetermined range of motion between a first limit and a second limit, said internal combustion engine having an ignition on state and an ignition off state, said method comprising the steps of:
   a) actuating said motor in a first rotational direction to drive said intake control valve to said first limit; and
   b) actuating said motor in a second and opposite rotational direction to drive said intake control valve to said second limit,
   wherein said actuating steps are carried out when said internal combustion engine is in said ignition off state.

2. A method in accordance with claim 1 wherein motion is rotational and wherein said range is about 90°.

3. A method in accordance with claim 1 wherein said engine is mounted in a vehicle having an engine ignition system, comprising the further step of determining that said ignition system is in a shut-off state.

4. A method in accordance with claim 3 wherein motion of said motor actuator and said intake air control valve is controlled by a programmable electronic controller, and wherein said controller is programmed with an algorithm for controlling said steps.

5. A method in accordance with claim 4 wherein said algorithm for controlling said steps is carried out in no more than 33 milliseconds.

6. In an intake air control system for an internal combustion engine having an ignition on state and an ignition off state, the system including an intake air valve having a predetermined range of motion between a first limit and a second limit and being actuated by a DC motor having at least one commutator and at least one brush, and a programmable controller for controlling motion of the DC motor, the improvement comprising:
   programming said controller to firstly actuate said motor in a first rotational direction to drive said intake air valve to said first limit, and then to secondly actuate said motor in a second and opposite rotational direction to drive said intake air valve to said second limit,
   said first and second actuations occurring when said internal combustion engine is in said ignition off state to cause contaminants in said DC motor to be dislodged therefrom.

7. An internal combustion engine having an ignition on state and an ignition off state and comprising an intake air control system including an intake air valve having a predetermined range of motion between a first limit and a second limit and being actuated by a DC motor having at least one commutator and at least one brush, and a programmable controller for controlling motion of the DC motor, said controller being programmed to firstly actuate said motor in a first rotational direction to drive said intake air valve to said first limit, and then to secondly actuate said motor in a second and opposite rotational direction to drive said intake air valve to said second limit, said first and second actuations occurring when said internal combustion engine is ignition off state to cause contaminants in said DC motor to be dislodged therefrom.

* * * * *